(12) United States Patent
Velayudhan et al.

(10) Patent No.: US 9,208,039 B2
(45) Date of Patent: Dec. 8, 2015

(54) SYSTEM AND METHOD FOR DETECTING SERVER REMOVAL FROM A CLUSTER TO ENABLE FAST FAILOVER OF STORAGE

(71) Applicant: LSI Corporation, San Jose, CA (US)

(72) Inventors: Vinu Velayudhan, Milpitas, CA (US); James A. Rizzo, Austin, TX (US); Adam Weiner, Henderson, NV (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 152 days.

(21) Appl. No.: 14/058,569

(22) Filed: Oct. 21, 2013

(65) Prior Publication Data

US 2015/0113312 A1 Apr. 23, 2015

(51) Int. Cl.
*G06F 11/00* (2006.01)
*G06F 11/20* (2006.01)
*G06F 11/26* (2006.01)

(52) U.S. Cl.
CPC .......... *G06F 11/2092* (2013.01); *G06F 11/261* (2013.01); *G06F 2201/805* (2013.01)

(58) Field of Classification Search
CPC ....................................................... G06F 11/261
See application file for complete search history.

(56) References Cited

U.S. PATENT DOCUMENTS

| | | | |
|---|---|---|---|
| 6,378,084 B1 * | 4/2002 | Strunk et al. ...................... | 714/2 |
| 6,408,343 B1 * | 6/2002 | Erickson et al. ................ | 710/15 |
| 6,948,012 B1 * | 9/2005 | Valin et al. ....................... | 710/38 |
| 7,127,798 B1 * | 10/2006 | Reger et al. ................. | 29/603.03 |
| 7,434,107 B2 * | 10/2008 | Marks .............................. | 714/43 |
| 7,574,630 B1 * | 8/2009 | Ranaweera et al. ............. | 714/43 |
| 2006/0236030 A1 * | 10/2006 | Nakamura et al. ............ | 711/114 |
| 2007/0255900 A1 * | 11/2007 | Lee et al. ........................ | 711/114 |
| 2009/0006889 A1 * | 1/2009 | Holdaway et al. ................. | 714/9 |
| 2010/0077252 A1 * | 3/2010 | Siewert et al. ..................... | 714/6 |
| 2011/0145630 A1 * | 6/2011 | Maciorowski et al. ...... | 714/4.11 |
| 2013/0124801 A1 * | 5/2013 | Natrajan ............. | G06F 12/0868 711/126 |
| 2013/0304775 A1 * | 11/2013 | Davis et al. .................... | 707/827 |
| 2014/0310441 A1 * | 10/2014 | Klughart ....................... | 710/301 |

* cited by examiner

*Primary Examiner* — Amine Riad

(57) ABSTRACT

Aspects of the disclosure pertain to a system and method for detecting server removal from a cluster to enable fast failover of storage (e.g., logical volumes). A method of operation of a storage controller of a cluster is disclosed. The method includes receiving a signal. The method further includes, based upon the received signal, determining that communicative connection between a second storage controller of the cluster and the first storage controller of cluster is unable to be established. The method further includes determining whether communicative connection between the first storage controller and expanders of first and second enclosure services manager modules of the cluster is able to be established. The method further includes, when it is determined that communicative connection between the first storage controller and the expanders of the first and second enclosure services manager modules of the cluster is able to be established, performing a failover process.

20 Claims, 3 Drawing Sheets

SYSTEM AND METHOD FOR DETECTING SERVER REMOVAL FROM A CLUSTER TO ENABLE FAST FAILOVER OF STORAGE

FIELD OF THE INVENTION

The present disclosure relates to the field of data storage systems.

BACKGROUND

Failover is switching (e.g., automatic switching) by a system to a redundant or standby computer server, system, hardware component, or network upon the failure or abnormal termination of a previously active application, server, system, hardware component or network. A number of techniques are currently implemented to provide failover functionality.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure pertain to a system and method for detecting server removal from a cluster to enable fast failover of storage (e.g., logical volumes).

DESCRIPTION OF THE FIGURES

The detailed description is described with reference to the accompanying figures.

WRITTEN DESCRIPTION

Embodiments of the invention will become apparent with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

Figure 1:
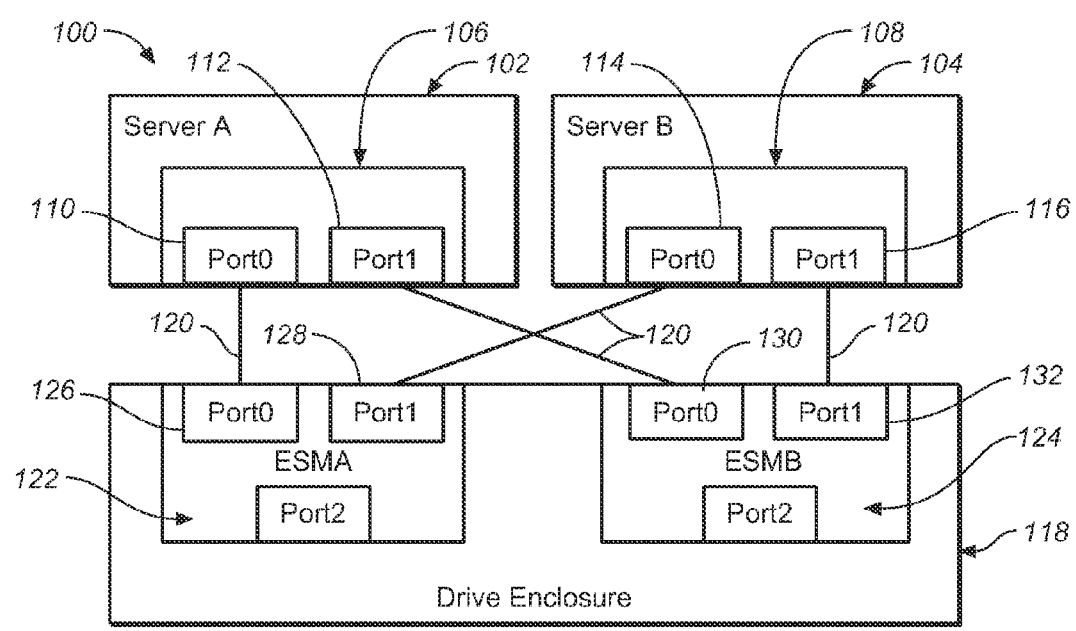
FIG. 1 is an example conceptual block diagram schematic of a system in accordance with an exemplary embodiment of the present disclosure.

Referring to FIG. 1, a system 100 is shown. In embodiments, the system 100 is a cluster. A cluster may be defined as, but is not limited to being defined as, a set of loosely or tightly connected computers that work together so that, in many respects, they may be viewed as a single system. Further, components of the cluster may be connected to each other through fast local area networks (LANs), with each node (e.g., computer being used as a server) running its own instance of an operating system.

In implementations, the cluster 100 is a direct-attached storage (DAS) cluster. In examples, the cluster 100 includes a plurality of servers. For example, the cluster 100 includes a first server 102 (e.g., Server A) and a second server 104 (e.g., Server B). A server may defined as, but is not limited to being defined as, a computer system (e.g., a computer), a node, and/or the like. In example embodiments, each of the servers (102, 104) includes a processor and memory (not shown).

In examples, the cluster 100 includes a plurality of storage controllers. For example, the cluster 100 includes two storage controllers, the first storage controller 106 being included in the first server (e.g., Server A) 102, the second storage controller 108 being included in the second server (e.g., Server B) 104. A storage controller may be defined as, but is not limited to being defined as, a device which manages physical disk drives and presents them to a computer as logical units. In example embodiments, each of the storage controllers (106, 108) includes a processor (not shown). In further embodiments, each of the storage controllers (106, 108) includes memory (e.g., cache) (not shown).

In embodiments, the first storage controller 106 includes a plurality of ports (e.g., communications ports, input/output ports). For example, the first storage controller 106 includes a first port (e.g., Port 0) 110 and a second port (e.g., Port 1) 112. In implementations, the first port 110 and second port 112 are Serial Attached SCSI (SAS) ports. A port may be defined as, but is not limited to being defined as, a communications interface (e.g., physical interface) between a computer and other computers or devices.

In implementations, the second storage controller 108 includes a plurality of ports (e.g., communication ports, input/output ports). For instance, the second storage controller 108 includes a first port (e.g., Port 0) 114 and a second port (e.g., Port 1) 116. In embodiments, the first and second ports (114, 116) of the second storage controller 108 are SAS ports.

In examples, the cluster 100 includes a drive enclosure 118. For example, the drive enclosure 118 is an external, just a bunch of drives (JBOD) drive enclosure. In embodiments, the drive enclosure 118 is connected to (e.g., configured for being communicatively coupled with) the first server 102 and the second server 104 via a plurality of communications links 120 (e.g. SAS communications links, SAS lines). In implementations, the drive enclosure includes a plurality of disk drives (not shown). For example, the disk drives may be hard disk drives, optical disk drives, floppy disk drives, or the like. A drive (e.g., disk drive) may be defined as, but is not limited to being defined as, a device for implementing a storage mechanism where data is recorded by various electronic, magnetic, optical or mechanical changes to a surface layer of one or more rotating disks. A drive enclosure may be defined as, but is not limited to being defined as, a specialized casing designed to hold and power disk drives while providing a mechanism to allow the disk drives to communicate with one or more separate computers.

In embodiments, the drive enclosure 118 includes a plurality of enclosure services manager modules (ESM). For example, the drive enclosure 118 includes a first ESM (e.g., ESM A) 122 and a second ESM (e.g., ESM B) 124. In implementations, the first ESM 122 includes a plurality of ports (e.g., communications ports, input ports, output ports, input/output ports). For instance, the first ESM 122 includes a first port (e.g., Port 0) 126 and a second port (e.g., Port 1) 128. In examples, the second ESM 124 includes a plurality of ports (e.g., communications ports, input ports, output ports, input/output ports). For instance, the second ESM 124 includes a first port (e.g., Port 0) 130 and a second port (e.g., Port 1) 132.

In implementations, the first port 126 of the first ESM 122 is connected to (e.g., configured for being communicatively coupled with) the first port 110 of the first storage controller 106 via communications link(s) 120. Further, the second port 128 of the first ESM 122 is connected to (e.g., configured for being communicatively coupled with) the first port 114 of the second storage controller 108 via communications link(s) 120. Thus, the first and second ports (126, 128) of the first ESM 122 provide a communications channel between the first port 110 of the first storage controller 106 and the first port 114 of the second storage controller 108.

In examples, the first port 130 of the second ESM 124 is connected to (e.g., configured for being communicatively coupled with) the second port 112 of the first storage controller 106 via communications link(s) 120. Further, the second port 132 of the second ESM 124 is connected to (e.g., configured for being communicatively coupled with) the second port 116 of the second storage controller 108 via communications link(s) 120. Thus, the first and second ports (130, 132) of the second ESM 124 provide a communications channel between the second port 112 of the first storage controller 106 and the second port 116 of the second storage controller 108.

In embodiments, the first ESM 122 and second ESM each include one or more expanders (not shown). An expander may be defined as, but is not limited to being defined as, a device that forms part of a service delivery subsystem and facilitates communication between devices, such as facilitating connection of multiple end devices to a single initiator port. For example, if the expander is a SAS expander, it facilitates communication between SAS devices.

In implementations, the system (e.g., cluster) 100 is configured for providing high availability access to logical volumes, the logical volumes having been created using the drives of the drive enclosure 118. A logical volume may be defined as, but is not limited to being defined as, a storage medium that is associated with a logical disk, the logical volume typically residing on one or more disk drives (e.g., hard disk drives). In embodiments, the drives that define a logical volume are owned by only one of the storage controllers (106, 108) of the system 100 at any given time.

In examples, each storage controller (106, 108) of the system 100 is configured (e.g., with sufficient logic, with sufficient control logic, with sufficient control programming) for detecting when one or more of the other storage controller(s) (e.g., remote storage controller(s)) of the system 100 is in a failed state (e.g., has failed). Further, each storage controller (106, 108) is configured with sufficient logic that, when the storage controller detects that the other storage controller(s) of the system 100 is/are in a failed state, the storage controller is configured to take over ownership of (e.g., handle, process) drives (e.g., logical volumes) owned by those storage controller(s) which is/are detected as being in a failed state. In implementations, such taking over of ownership is known as failover. Further, failover may be defined as, but is not limited to being defined as, switching (e.g., via an automated process) to a redundant or standby computer server, system, hardware component, or network upon the failure or abnormal termination of the previously active application, server, system, hardware component, or network. In implementations, a storage controller of the system 100 is in a failed state when it is partially or fully non-functional, and/or when it has been removed from the system 100.

In embodiments, each storage controller (106, 108) is configured for detecting when other storage controller(s) of the system 100 are in a failed state by processing device removal events that it receives (e.g., that its firmware receives). For example, if the storage controller 108 of the second server 104 is removed from (e.g., taken out of) the cluster 100, the storage controller 106 of the first server 102 is configured for receiving a device removal event on its first port 110 and its second port 112. Further, the storage controller 106 of the first server 102 is configured for processing the received device removal event, and based upon said processing, is configured for determining that the second storage controller 108 has been removed from the cluster 100 and thus, that the second storage controller 108 is in a failed state.

Figure 2:
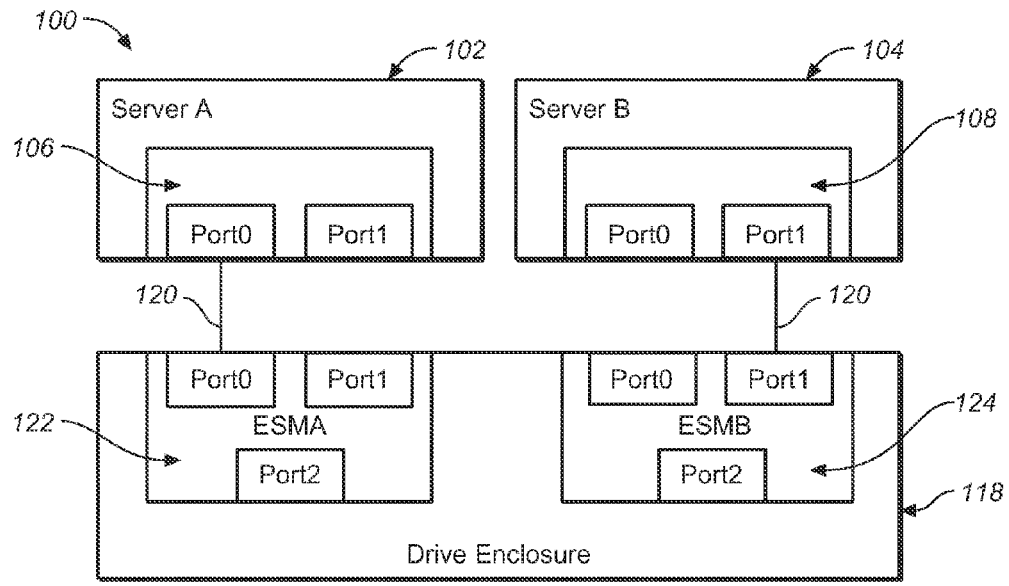
FIG. 2 is an example conceptual block diagram schematic of a split brain operation mode for the system shown in FIG. 1, in accordance with an exemplary embodiment of the present disclosure.

In an example scenario, the system 100 is configured for operating in a split brain mode, as shown in FIG. 2. In the split brain mode, the storage controller 106 of the first server 102 does not detect the presence of the storage controller 108 of the second server 104 in the system 100 (e.g., on the SAS topology). Further, the storage controller 108 of the second server 104 does not detect the presence of the storage controller 106 of the first server 102 in the system 100. Both storage controllers (106, 108) are in non-failed states (e.g., are fully operational) and have access to the drives (e.g., logical volumes) in the drive enclosure 118. However, the storage controller 106 of the first server 102 does not have access to (e.g., cannot connect to) the second ESM 124, and the storage controller 108 of the second server 104 does not have access to (e.g., cannot connect to) the first ESM 122. In the split brain scenario, because both storage controllers (106, 108) are in a non-failed state, neither storage controller can take over the drives owned by the other storage controller.

Figure 3:
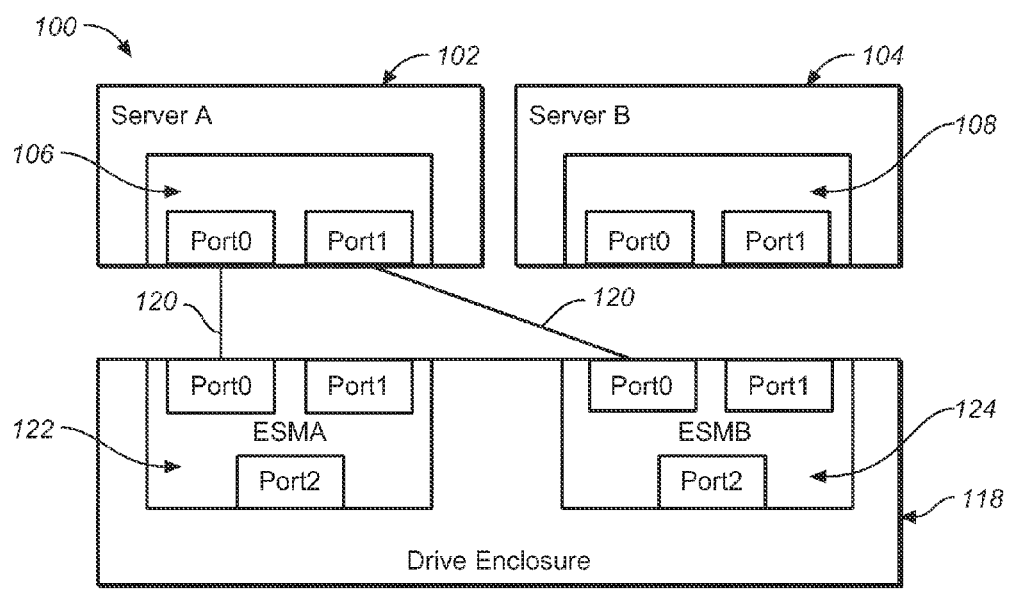
FIG. 3 is an example conceptual block diagram schematic of a controller removal operation mode for the system shown in FIG. 1, in accordance with an exemplary embodiment of the present disclosure.

In another example scenario, the system 100 is configured for operating in a controller removal mode, as shown in FIG. 3. As with the split brain mode, in the controller removal mode, the storage controllers (106, 108) of the servers (102, 104) do not detect each other's presence in the cluster 100. However, in the controller removal mode scenario shown in FIG. 3, the second storage controller 108 is in a failed state (e.g., has been disconnected/removed from the cluster, has become partially or fully non-functional). In the controller removal scenario, the first storage controller 106 still has access to (e.g., can connect to) the first ESM 122 and the second ESM 124, and thus, can connect to the expanders of the first ESM 122 and the second ESM 124. For example, the first storage controller 106 is able to connect to the first ESM 122 and the second ESM 124 via the first and second ports (Port 0 and Port 1) respectively of the first storage controller 106. However, in the controller removal scenario depicted in FIG. 3, since the second storage controller 108 is in the failed state, it is no longer connected to the first storage controller 106, it is no longer a part of the cluster 100, it cannot access any of the drives (e.g., logical volumes) of the cluster 100, it cannot access any of the ESMs (122, 124) of the cluster 100, and thus, it cannot access the expanders of any of the ESMs of the cluster 100. For the controller removal scenario shown in FIG. 3, the first storage controller 106 is configured to take over ownership of the drives owned by the second storage controller 108.

In embodiments, for both the split brain scenario (FIG. 2) and the controller removal scenario (FIG. 3), each storage controller (106, 108) receives device removal notifications via its ports, the device removal notifications indicating that the other controller (e.g., remote controller) of the storage controllers (106, 108) cannot be accessed via any of the communication links (e.g., SAS lines) 120. In implementations, the storage controllers (106, 108) are configured to quickly distinguish between a split brain and controller removal scenario for promoting improved efficiency of the cluster 100. For example, when confronted with the controller removal scenario shown in FIG. 3, the first storage controller 106 (non-failed storage controller) is configured to quickly recognize the scenario and to quickly take over ownership of the drives owned by the second storage controller 108 (e.g., the failed/removed storage controller), so as to promote reduced storage downtime in the cluster 100. In examples, in a controller removal scenario, the storage controller which is in the non-failed state is configured to implement an algorithm for determining whether it can access expanders which can no longer be accessed by the failed (e.g., removed) storage controller. Being able to quickly determine whether the other storage controller is really failed/removed (e.g., as in a controller removal scenario) or whether the cluster 100 is operating in a split brain mode promotes the ability of the storage controllers to quickly implement failover and take over the drives owned by the other storage controller when the other storage controller is in a failed state (e.g., has been removed from the cluster). In examples, the storage controllers (106, 108) are configured to provide failover at a speed which is faster than is provided in existing clustering solutions, and which allows the controllers to meet existing failover timing requirements, such as those required by existing Microsoft® clustering solutions.

In implementations, each storage controller (106, 108) is configured to recognize that the accessibility of the other storage controller to the expanders of the ESMs (122, 124) via the communications links (e.g., SAS links) 120 is a key factor in determining whether the other controller is in a non-failed state (e.g., still in the cluster) or is in a failed state (e.g., no longer in cluster). For example, if the first storage controller 106 is in a non-failed state and cannot connect to (e.g., cannot reach, cannot communicate with) the second storage controller, however, the first storage controller 106 determines that the first storage controller 106 is able to connect to (e.g., access) the expanders of both ESMs (122, 124), then the first storage controller 106 is able to determine that the second storage controller is in a failed state (e.g., has been removed from the cluster 100).

Figure 4:
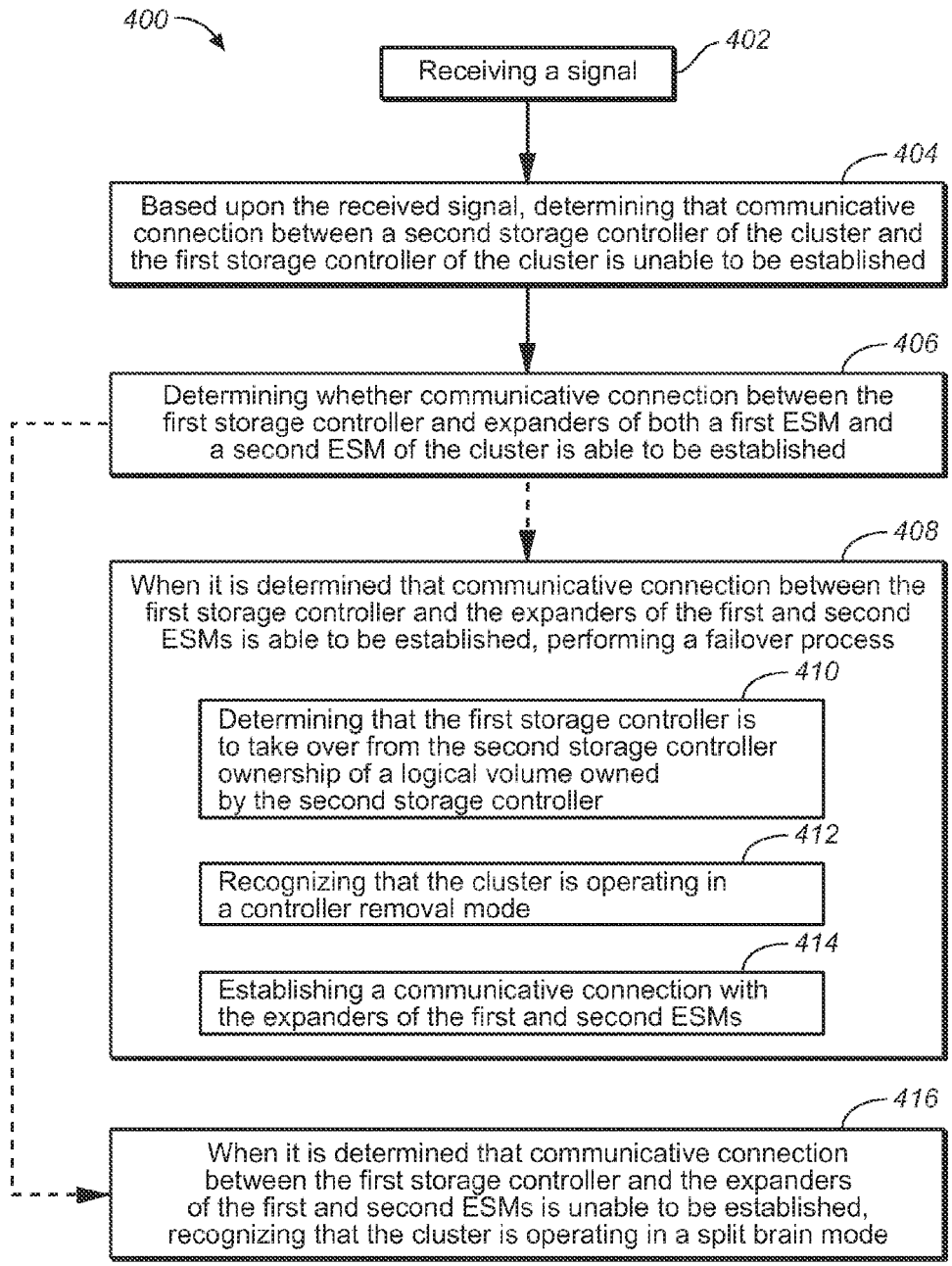
FIG. 4 is a flow chart illustrating a method of operation of a storage controller of the system shown in FIG. 1 in accordance with an exemplary embodiment of the present disclosure.

FIG. 4 is a flowchart illustrating a method of operation of a storage controller (e.g., first storage controller) of the system (e.g., cluster) 100 described above. For example, the cluster is a direct-attached storage cluster. In embodiments, the method 400 includes receiving a signal (Block 402). For example, the signal is a device removal notification. The method 400 further includes, based upon the received signal, determining that a communicative connection between a second storage controller of the cluster and the first storage controller of cluster is unable to be established (Block 404). For instance, based upon the received device removal notification, the first storage controller determines that it cannot connect to the second storage controller of the cluster via any of the communication links of the cluster. In embodiments, the first storage controller is implemented in a first server of the cluster, and the second storage controller is implemented in a second server of the cluster. For example, the second server is remotely located from the first server.

In implementations, the method 400 further includes determining whether communicative connection between the first storage controller and expanders of both a first enclosure services manager module (first ESM) and a second enclosure services manager module (second ESM) of the cluster is able to be established (Block 406). For example, the first storage controller determines whether or not it can access or connect to, via communications links of the cluster, to the expanders of the first ESM and the second ESM of the cluster. The method 400 further includes, when it is determined that communicative connection between the first storage controller and the expanders of both the first ESM and the second ESM is able to be established, performing a failover process (Block 408).

In examples, performing the failover process includes determining that the first storage controller is to take ownership of a logical volume owned by the second storage controller (Block 410). In examples, determining that the first storage controller is to take over from the second storage controller ownership of a logical volume owned by the second controller includes recognizing that the cluster is operating in a controller removal mode (Block 412). In implementations, performing the failover process further includes establishing communicative connection between the first storage controller and the expanders of the first and second ESMs (Block 414). For example, the first storage controller accesses (e.g., connects to) the expanders of the first and second ESMs via communication link(s) of the cluster and takes ownership of logical volume(s) previously owned by the second storage controller.

In embodiments, the method 400 further includes, when it is determined that communicative connection between the first storage controller and the expanders of the first and second ESMs is unable to be established, recognizing that the cluster is operating in a split brain mode (Block 416).

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of operation of a first storage controller of a cluster, the method comprising:
   receiving a signal indicating device removal;
   based upon the received signal, determining that a communicative connection between a second storage controller of the cluster and the first storage controller of cluster is unable to be established;
   determining whether communicative connection between the first storage controller and expanders of both a first enclosure services manager module and a second enclosure services manager module of the cluster is able to be established; and if it is determined that communicative connection between the first storage controller and the expanders of both the first and second enclosure services manager modules of the cluster is able to be established, performing a failover process; and if it is determined that communicative connection between the first storage controller and the expanders of both the first and second enclosure services manager modules of the cluster is unable to be established, detecting a split brain condition.

2. The method as recited in claim 1, further comprising:
when it is determined that communicative connection between the first storage controller and the expanders of the first and second enclosure services manager modules of the cluster is unable to be established, recognizing that the cluster is operating in a split brain mode.

3. The method as recited in claim 1, wherein performing the failover process includes:
determining that the first controller is to take ownership of a logical volume owned by the second storage controller.

4. The method as recited in claim 3, wherein performing the failover process further includes:
establishing communicative connection between the first storage controller and the expanders of the first and second enclosure services manager modules of the cluster.

5. The method as recited in claim 1, wherein the cluster is a direct-attached storage cluster.

6. The method as recited in claim 1, wherein the signal IS a device removal notification.

7. The method as recited in claim 1, wherein the first storage controller is implemented in a first server, and the second storage controller is implemented in a second server.

8. The method as recited in claim 3, wherein determining that the first storage controller is to take ownership of the logical volume owned by the second storage controller includes recognizing that the cluster is operating in a controller removal mode.

9. A non-transitory computer-readable medium having computer-executable instructions for performing a method of operation of a first storage controller of a cluster, the method comprising:
receiving a signal indicating device removal;
based upon the received signal, determining that a communicative connection between a second storage controller of the cluster and the first storage controller of cluster is unable to be established;
determining whether communicative connection between the first storage controller and expanders of both a first enclosure services manager module and a second enclosure services manager module of the cluster is able to be established; and
when it is determined that communicative connection between the first storage controller and the expanders of both the first and second enclosure services manager modules of the cluster is able to be established, performing a failover process.

10. The non-transitory computer-readable medium as recited in claim 9, further comprising:
when it is determined that communicative connection between the first storage controller and the expanders of the first and second enclosure services manager modules of the cluster is unable to be established, recognizing that the cluster is operating in a split brain mode.

11. The non-transitory computer-readable medium as recited in claim 9, wherein performing the failover process includes:
determining that the first storage controller is to take ownership of a logical volume owned by the second storage controller.

12. The non-transitory computer-readable medium as recited in claim 11, wherein performing the failover process further includes:
establishing communicative connection between the first storage controller and the expanders of the first and second enclosure services manager modules of the cluster.

13. The non-transitory computer-readable medium as recited in claim 9, wherein the cluster is a direct-attached storage cluster.

14. The non-transitory computer-readable medium as recited in claim 9, wherein the signal is a device removal notification.

15. The non-transitory computer-readable medium as recited in claim 9, wherein the first storage controller is implemented in a first server, and the second storage controller is implemented in a second server.

16. The non-transitory computer-readable medium as recited in claim 11, wherein determining that the first storage controller is to take ownership of the logical volume owned by the second storage controller includes recognizing that the cluster is operating in a controller removal mode.

17. A first storage controller for implementation in a server of a cluster, the storage controller comprising:
a processor; and
control logic for being executed by the processor for causing the storage controller to implement a method of operation, the method including:
receiving a signal indicating device removal;
based upon the received signal, determining that a communicative connection between a second storage controller of the cluster and the first storage controller of cluster is unable to be established;
determining whether communicative connection between the first storage controller and expanders of both a first enclosure services manager module and a second enclosure services manager module of the cluster is able to be established; and
when it is determined that communicative connection between the first storage controller and the expanders of the first and second enclosure services manager modules is able to be established, performing a failover process.

18. The storage controller as recited in claim 17, wherein performing the failover process includes:
determining that the first storage controller is to take ownership of a logical volume owned by the second storage controller.

19. The storage controller as recited in claim 18, wherein performing the failover process includes:
establishing communicative connection between the first storage controller and the expanders of the first and second enclosure services manager modules.

20. The storage controller as claimed in claim 17, wherein the cluster is a direct-attached storage cluster.

* * * * *